United States Patent
Kim et al.

(10) Patent No.: US 10,637,827 B2
(45) Date of Patent: Apr. 28, 2020

(54) SECURITY NETWORK SYSTEM AND DATA PROCESSING METHOD THEREFOR

(71) Applicant: SAMSUNG ELECTRONICS CO., LTD., Suwon-si (KR)

(72) Inventors: Yu-sun Kim, Hwaseong-si (KR); In-ho Kim, Yongin-si (KR); In-hwan We, Suwon-si (KR); Jong-tak Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 15/736,023

(22) PCT Filed: Jul. 21, 2016

(86) PCT No.: PCT/KR2016/007958
§ 371 (c)(1),
(2) Date: Dec. 13, 2017

(87) PCT Pub. No.: WO2017/018719
PCT Pub. Date: Feb. 2, 2017

(65) Prior Publication Data
US 2018/0145948 A1    May 24, 2018

(30) Foreign Application Priority Data
Jul. 27, 2015 (KR) .................. 10-2015-0105664

(51) Int. Cl.
*H04L 29/06* (2006.01)
*G06F 21/60* (2013.01)
*G06F 21/74* (2013.01)

(52) U.S. Cl.
CPC ........ *H04L 63/0236* (2013.01); *G06F 21/604* (2013.01); *G06F 21/606* (2013.01);
(Continued)

(58) Field of Classification Search
CPC ..... H04L 63/0236; H04L 63/20; H04L 69/22; H04L 69/16
(Continued)

(56) References Cited

U.S. PATENT DOCUMENTS 8,935,772 B2   1/2015  Devine et al.
8,959,363 B2   2/2015  Saripalli
(Continued)

FOREIGN PATENT DOCUMENTS

KR   10-2009-0026846 A   3/2009
KR   10-2012-0016482 A   2/2012
(Continued)

OTHER PUBLICATIONS

International Search Report, dated Oct. 25, 2016 by International Searching Authority in corresponding International Application No. PCT/KR2016/007958 (PCT/ISA/210).
(Continued)

*Primary Examiner* — Eleni A Shiferaw
*Assistant Examiner* — Angela R Holmes
(74) *Attorney, Agent, or Firm* — Sughrue Mion, PLLC

(57) ABSTRACT

A security network system is disclosed. The security network system includes a processor selectively operable in either a normal world or a secure world, wherein the processor receives, from an external network, a packet by using a network driver module of the secure world, extracts data of the packet by using a TCP/IP module of the secure world if the packet received from the external network is used in the secure world, uses the data of the packet in the secure world, and extracts the data of the packet by using the TCP/IP module of the secure world so as to transmit the data of the packet to the normal world if the packet is not used in the secure world.

10 Claims, 9 Drawing Sheets

(52) U.S. Cl.
CPC .............. *G06F 21/74* (2013.01); *H04L 63/20* (2013.01); *H04L 69/22* (2013.01); *H04L 69/16* (2013.01)

(58) Field of Classification Search
USPC .......................................................... 726/13
See application file for complete search history.

(56) References Cited

U.S. PATENT DOCUMENTS

| | | |
|---|---|---|
| 2009/0132776 A1 | 5/2009 | Kurauchi |
| 2012/0084545 A1 | 4/2012 | Farina et al. |
| 2014/0316993 A1 | 10/2014 | Spitz |
| 2015/0033289 A1 | 1/2015 | Caceres et al. |
| 2015/0052614 A1 | 2/2015 | Crowell et al. |
| 2015/0089246 A1 | 3/2015 | Kanai et al. |

FOREIGN PATENT DOCUMENTS

| | | |
|---|---|---|
| KR | 10-2014-0027580 A | 3/2014 |
| KR | 10-2014-0129716 A | 11/2014 |

OTHER PUBLICATIONS

Written Opinion, dated Oct. 25, 2016 by International Searching Authority in corresponding International Application No. PCT/KR2016/007958 (PCT/ISA/237).

SECURITY NETWORK SYSTEM AND DATA PROCESSING METHOD THEREFOR

TECHNICAL FIELD

Apparatuses and methods consistent with the present invention relate to a security network system and a data processing method therefor, and more particularly to, a security network system for improving security by using a security area, and a data processing method therefor.

BACKGROUND ART

Various types of electronic devices have been developed and distributed with the development of electronic technology. Also, efforts to improve security when using electronic devices have been continuously made.

As one of systems developed by the efforts, a system including an additional secure area together with a non-secure area has been used in order to improve security.

However, although such a system is used, a data modulation may easily occur in a non-secure area by a third person. Therefore, the system is still vulnerable to security.

Therefore, there is a need for a security network system capable of strengthening security.

DETAILED DESCRIPTION OF THE INVENTION

Technical Problem

The present invention provides a security network system for improving security and a data processing method therefor.

Technical Solution

According to an aspect of the present invention, a security network system includes a processor configured to be selectively operable in one of a normal world and a secure world, wherein the processor receives a packet from an external network by using a network driver module of the secure world, if the packet received from the external network is used in the secure world, extracts data of the packet by using a TCP/IP module of the secure world and uses the data of the packet in the secure world, and if the packet is not used in the secure world, extracts the data of the packet by using the TCP/IP module of the secure world so as to transmit the data of the packet to the normal world.

The processor may determine whether the packet is used in the secure world, by using field information included in a packet header of the packet.

The secure world may include a network server module configured to take charge of data communication in the secure world, and integrate and manage the data of the packet.

If data is generated in the secure world, the processor may generate a secure packet corresponding to the generated data by using the TCP/IP module of the secure world and transmit the secure packet to the external network by using the network driver module of the secure world.

If data is generated in the normal world, the processor may generate a normal packet corresponding to the generated data by using a TCP/IP module of the normal world and transmit the normal packet to the external network by using a network driver module of the normal world.

If a data transmission from the normal world and a data transmission from the secure world are respectively requested, the processor may transmit the data generated in the normal world and the data generated in the secure world together by using the TCP/IP module and the network driver module of the secure world.

According to an aspect of the present invention, a data processing method of a security network system including a normal world and a secure world, includes receiving a packet from an external network by using a network driver module of the secure world, if the received packet is used in the secure world, extracting data of the packet by using a TCP/IP module of the secure world and using the data of the packet in the secure world, and if the packet is not used in the secure world, extracting the data of the packet by using the TCP/IP module of the secure world and using the data of the packet in the normal world.

The using of the data of the packet in the normal world may include, if the packet is not used in the secure world, extracting the data of the packet by using the TCP/IP module of the secure world, and transmitting the extracted data from a monitor module of the secure world to the normal world.

The data processing method may further include determining whether the packet is used in the secure world according to field information of the packet header.

The secure world may include a network server module configured to take charge of data communication in the secure world, and integrate and manage the data of the packet.

The data processing method may further include, if data is generated in the secure world, generating a secure packet corresponding to the generated data by using the TCP/IP module of the secure world, and transmitting the secure packet to the external network by using the network driver module of the secure world.

The data processing method may further include, if data is generated in the normal world, generating a normal packet corresponding to the generated data by using a TCP/IP module of the normal world, and transmitting the normal packet to the external network by using a network driver module of the normal world.

The data processing method may further include, if a data transmission from the normal world and a data transmission from the secure world are respectively requested, transmitting the data generated in the normal world and the data generated in the secure world together to the external network by using the TCP/IP module and the network driver module of the secure world.

According to another aspect of the present invention, a computer readable recording medium records thereon a program for executing a data processing method of a security network system including a normal world and a secure world. The program may executes receiving a packet from an external network by using a network driver module of the secure world, if the received packet is used in the secure world, extracting data of the packet by using a TCP/IP module of the secure world and using the data of the packet in the secure world, and if the packet is not used in the secure world, extracting the data of the packet by using the TCP/IP module of the secure world and using the data of the packet in the normal world.

Advantageous Effects of the Invention

According to various exemplary embodiments of the present invention as described above, security of a security network system may be greatly improved.

BEST MODE

Mode of the Invention

Figure 1:
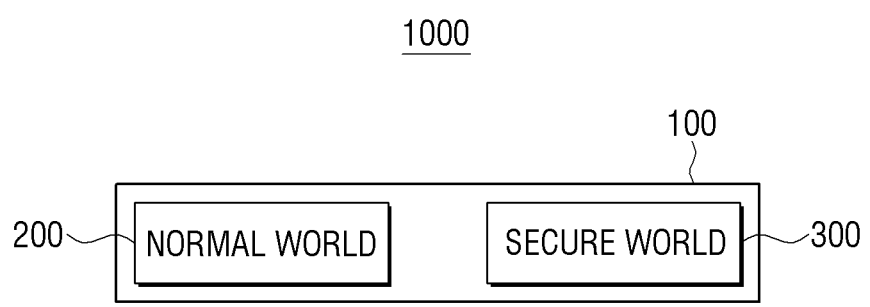
FIG. 1 is a block diagram of a configuration of a security network system according to an exemplary embodiment of the present invention.

Hereinafter, an exemplary embodiment of the present invention will be described in more detail with reference to the attached drawings.

The terms used in the specification and claims of the present invention are selected as general terms in consideration of functions in various exemplary embodiments of the present invention. However, these terms may depend on intentions of those skilled in the art or legal or technical interpretations, emergences of new technologies, and the like. Some of the terms are arbitrarily selected by the applicant. These terms may be construed as meanings defined in the present specification, and unless the terms are defined in detail, the terms may be construed based on general contents of the present specification and common technical knowledge of the art to which exemplary embodiments belong.

Also, the same reference numerals or symbols respectively illustrated in the attached drawings denote parts or elements that perform the actually same functions. For convenience of description and understanding, the parts or elements will be described by using the same reference numerals or symbols even in different exemplary embodiments. In other words, although elements having the same reference numerals are all illustrated in a plurality of drawings, the plurality of drawings do not mean one exemplary embodiment.

The terms including ordinal numbers such as 'first', 'second', etc. may be used herein to distinguish elements from one another. These ordinal numbers are merely used to distinguish the same or similar elements from one another, and meanings of the terms are not construed as being limited by the using of the ordinal numbers. For example, use orders or arrangement orders of elements combined with these ordinal numbers are not limited by numbers thereof. The ordinal numbers may be replaced with one another.

As used herein, the singular forms are intended to include the plural forms as well, unless the context clearly indicates otherwise. It will be further understood that the terms "comprises," "comprising," etc. when used in this specification, specify the presence of stated features, integers, steps, operations, elements, and/or components, but do not preclude the presence or addition of one or more other features, integers, steps, operations, elements, components, and/or groups thereof.

In the exemplary embodiments of the present invention, the term "module," "unit," or "part" refers to an element that performs at least one function or operation, and this element may be implemented with hardware, software, or a combination of hardware and software. In addition, a plurality of "modules," a plurality of "units," or a plurality of "parts" may be integrated into at least one module or chip, except for a "module" or a "part" which has to be implemented as particular hardware so as to be implemented as at least one processor (not shown).

It will be understood that when a part is referred to as being "coupled with/to" or "connected to" another part, the part may be connected to the another part directly or through another medium. In addition, as long as there are no particularly contrary descriptions, what a part includes an element may mean that the part further includes another element not excluding another element.

Moreover, in the description of the prevent invention, if it is determined that detailed descriptions of related well-known functions or configurations may unnecessarily blur the main point of the present invention, the detailed descriptions may be abbreviated or omitted.

FIG. 1 is a block diagram of a configuration of a security network system 1000 according to an exemplary embodiment of the present invention.

Referring to FIG. 1, the security network system 1000 includes a processor 100. The processor 100 may be selectively operable in one of a normal world 200 and a secure world 330.

The secure world 300 refers to a data processing architecture that secures security, and the normal world 200 refers to a normal data processing architecture.

For example, the processor 100 may be an "ARM Trustzone Architecture." A runtime-architecture that is made by the ARM so as to be used for a micro-process system and divided into two has been well known as the "ARM Trustzone Architecture." The runtime-architecture includes two kinds of runtime environments. A non-secure runtime environment that is one of the two kinds of runtime environments may be referred to as a "Normal Zone" or a "Normal World." The non-secure runtime environment may be controlled by a normal operating system. A secure runtime environment that is the other one of the two kinds of runtime environments may be referred to as "Trustzone," "Trusted-World," or a Secure World. The secure runtime environment is controlled by a secure operating system.

Here, the normal operating system may be, for example, a usual operating system such as Android, a Windows phone, Symbian, or the like, and the secure operating system may be, for example, an operating system where a security kernel having an integrated security function is inserted into an existing operating system, like MOBICORE, RedCastle, or the like. According to the ARM Trustzone, the non-secure runtime environment and the secure runtime environment described above may be defined as virtual execution environments.

The processor 100 may selectively operate in one of the normal world 200 and the secure world 300 according to a user input. In detail, if a user selects a first menu (or a first button) for using the normal world 200, the processor 100 executes a first OS and operates in the normal world 200. If the user selects a second menu (or a second button) for using the secure world 300, the processor 100 executes a second OS and operates in the secure world 300.

According to exemplary embodiments, the first OS or the second OS may be set by default. For example, if the first OS is set to a default OS, and the security network system 1000 is booted or other particular events occur, the processor 100 executes the first OS and immediately operates in the normal world 200. If the user selects the second menu (or the second button) in this state, the processor 100 executes the second OS and operates in the secure world 300. Thereafter, if the user selects the first menu (or the first button), the processor 100 executes the first OS and returns to the secure world 300.

According to another exemplary embodiment, if the second menu (or the second button) is selected when the first OS is being executed, the processor 100 may enable the second OS to be executed by ending the security network system 1000 and then rebooting the security network system 1000.

According to another exemplary embodiment, if there is no user manipulation for a preset time when the first OS is executed, the processor 100 may end the first OS and drive the second OS. Similarly, if there is no user manipulation for a preset time when the second OS is executed, the processor 100 may end the second OS and drive the first OS.

In the above-described exemplary embodiment, it may be understood that the normal world 200 and the secure world 300 are executed on the premise of OSs respectively corresponding to the normal world 200 and the secure world 300. However, if an application generates data requiring security while the first OS is executed, the processor 100 may transmit and receive a packet together with external data by transmitting the corresponding data to the secure world 300 and generating the packet.

The secure world 300 may include various types of software such as a network driver module, a TCP/IP module, and the like separately from the normal world 200 in order to strengthen security. Alternatively, the secure world 300 may be realized as independent hardware different from the normal world 200. For example, the secure world 300 and the normal world 200 may be realized as different System on Chips (SoCs) or different processors. Alternatively, the secure world 300 and the normal world 200 may be realized as two areas into which one processor is logically divided.

Figure 2:
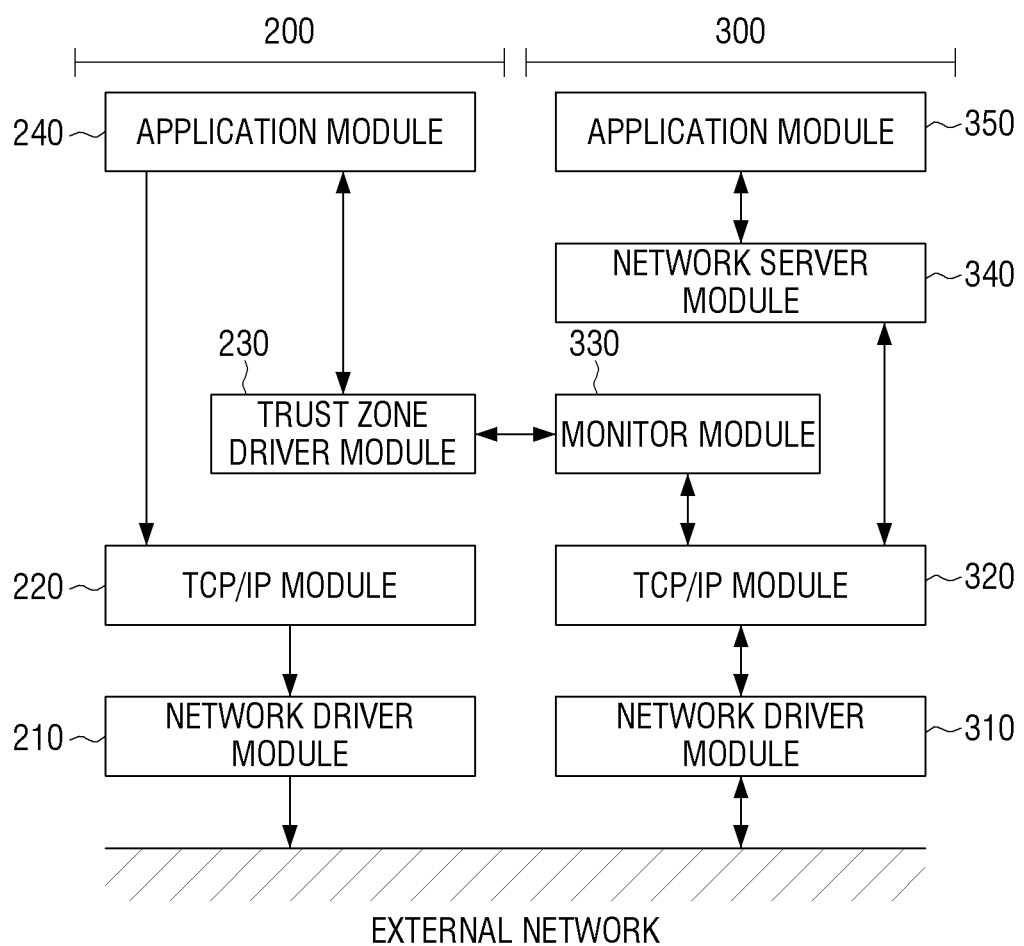
FIG. 2 is a block diagram of an example of a detailed configuration of the security network system of FIG. 1.

FIG. 2 is a block diagram of an example of a detailed configuration of the security network system 1000 of FIG. 1.

Referring to FIG. 2, the security network system 1000 of the present invention may include the normal world 200 and the secure world 300.

The normal world 200 may include a network driver module 210, a TCP/IP module 220, a trust zone driver module 230, and an application module 240.

The network driver module 210 may be software for controlling a network hardware device (not shown) that receives a packet from an external network. The packet may include, for example, a header and payload data. The header is data including information related to a transmission path of the packet, a transmission of the packet such as a time stamp or the like, and the payload data is data that becomes a fundamental purpose of the packet transmission and includes actual contents.

The TCP/IP module 220 may be software including an Internet network protocol. The processor 100 may extract the payload data from the packet by using the TCP/IP module 220 or may generate the packet by adding the header to the payload data. Here, TCP/IP includes an IP that is a packet communication type internet protocol and a TCP that is a transmission control protocol. The IP may not secure whether the packet is transmitted, and may make a transmission order and a reception order of the packet different. The TCP is a protocol that operates on the IP, secures a transmission of data, and receives the data in an order of transmitting the data.

The trust zone driver module 230 may be software that is included in an environment of the normal world 200 to transmit and receive data between the normal world 200 and the secure world 300. The processor 100 may transmit data, which is received from the application module 240 of the normal world 200, to the secure world 300 or may receive data from the secure world 300 and transmit the data to the application module 240 of the normal world 200 by using the trust zone driver module 230.

The application module 240 may be software that uses data received from another module or generate new data by executing an application having a particular function.

The secure world 300 may include a network driver module 310, a TCP/IP module 320, a monitor module 330, and an application module 350. Here, the network driver module 320, the TCP/IP module 320, and the application module 350 may be respectively different from the network driver module 210, the TCP/IP module 220, and the application module 240 of the normal world 200, but their functions are the same and thus their detailed descriptions are omitted.

The monitor module 330 operates as an interface between the normal world 200 and the secure world 300. In detail, the monitor module 330 may be software for taking charge of communication between the normal world 200 and the secure world 300 and changing a process between the respective worlds. As an example of a state change of the processor 100, if a state of the normal world 200 is changed into a state of the secure world 300, the processor 100 may store a process state in the normal worlds 200 in a memory (not shown) and restore a new process state, i.e., a state of the secure world 300 pre-stored in the memory (not shown), by using the monitor module 330.

The secure world 300 may take charge of data communication in the secure world 300 and include a network server module 340 that integrates and manages data of a packet.

The network server module 340 may be software that provides a service of data for elements (e.g. various types of modules, servers, drivers, and the like) of the secure world 300.

In detail, the network server module 340 may communicate with the application module 350 and other elements (e.g., various types of servers, drivers, and the like) in the secure world 300. For example, the network server module 340 may communicate with other modules in the secure world 300 by using an interprocess communication (IPC). Here, the IPC refers to a set of interfaces that enable communications between processes, and thus the network server module 340 may simultaneously communicate with a plurality of modules by using the IPC.

Together with this, the network server module 340 may integrate and manage data of the packet. In other words, the network server module 340 may integrate and manage a data transmission flow in the secure world 300. For example, the application module 350 may request a data transmission from the network server module 340. Here, the network server module 340 may transmit particular data stored in the memory (not shown) to the application module 350. Alternatively, if the network server module 340 receives a request for a transmission of particular data to an external source from the application module 350, the network server module 340 may transmit corresponding data stored in the memory (not shown) to the TCP/IP module 320.

Hereinafter, a data flow in the security network system 1000 will be described in detail with reference to FIG. 2.

When receiving the packet from the external network, the security network system 1000 may receive all of data, which is used in the normal world 200 and the secure world 300, through the secure world 300. When transmitting the packet to the external network, the security network system 1000 may generate a packet corresponding to data, which is generated in the normal world 200, in the normal world 200 and directly transmit the packet to the external network, and generate a packet corresponding to data, which is generated in the secure world 300, in the secure world 300 and directly transmit the packet to the external network.

In detail, the processor 100 may receive a packet from the external network by using the network driver module 310 of the secure world 300. The processor 100 may control network hardware (not shown) to receive the packet transmitted from the external network by using the network driver module 310. Here, the processor 100 may determine whether the packet received from the external network is used in the secure world 300. For this, the processor 100 may determine whether a packet 410 is used in the secure world 300, by using field information 413 included in a packet header 411 of the packet 410. This will be described in detail with reference to FIG. 3.

Figure 3:
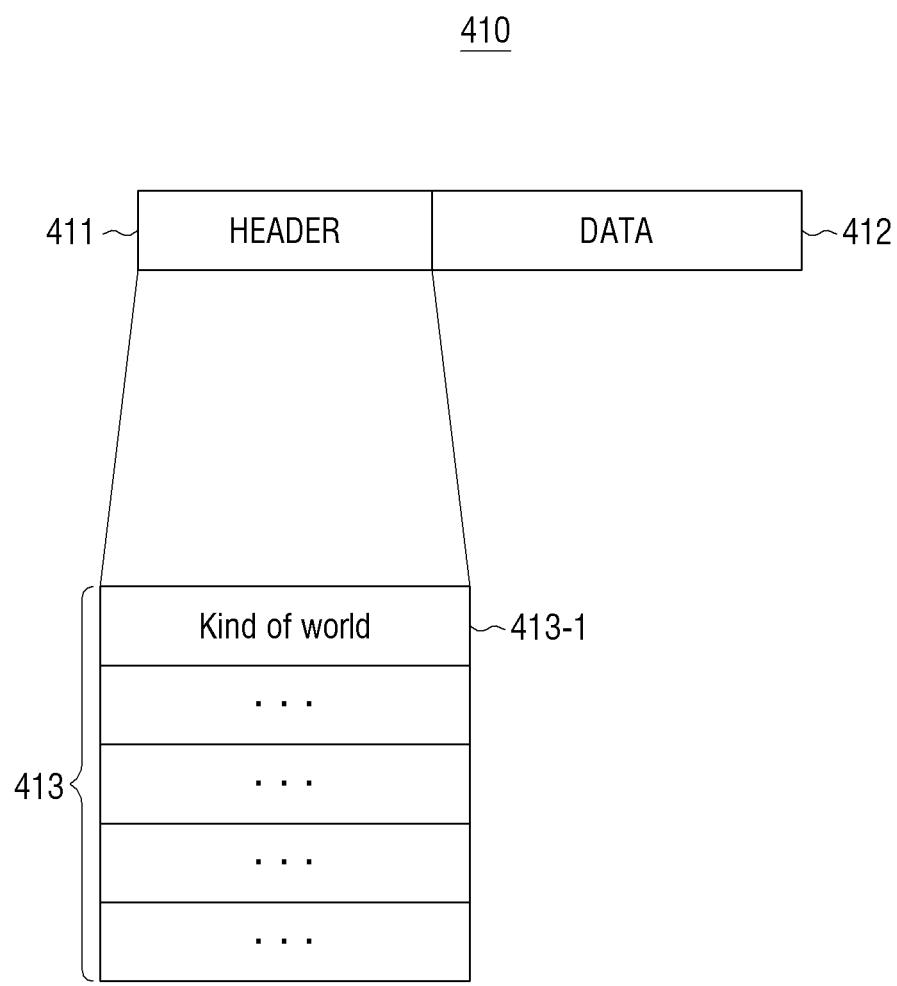
FIG. 3 illustrates an example of a packet structure processed in a security network system according to an exemplary embodiment of the present invention.

FIG. 3 illustrates an example of a packet structure processed in the security network system 1000 according to an exemplary embodiment of the present invention.

For example, the packet 410 may include the header 411 and payload data 412. The header 411 is data including information related to a transmission path of the packet 410, a transmission of the packet 410 such as a time stamp or the like, and the payload data 412 is data that becomes a fundamental purpose of the transmission of the packet 410 and includes actual contents. The packet header 411 (or the header 411?) may include a field 413-1 having information about whether the corresponding packet is used in the secure world 300.

Here, the processor 100 may determine whether a packet is used in the secure world 300 by using the information of the field 413-1 described above. For example, if a value of the corresponding field 413-1 is "0001," the processor 100 may determine that the packet 410 is used in the secure world 300. If the value of the corresponding field 413-1 is "0000," the processor 100 may determine that the packet 410 is not used in the secure world 300.

If the packet received from the external network is used in the secure world 300, the processor 100 may extract data of the packet by using the TCP/IP module 320 of the secure world 300 and may use the data of the packet in the secure world 300. Here, the TCP/IP module 320 may be formed of a TCP/IP stack.

For example, referring to FIG. 2, if the packet received from the external network is used in the secure world 300, the processor 100 may control the network driver module 310 to transmit the packet to the TCP/IP module 320. The processor 100 may extract merely payload data by dividing the packet into a header and the payload data by using the TCP/IP module 320. The processor 100 may transmit the extracted data of the packet to the network server module 340. Here, the network server module 340 may integrate and manage data of the received packet. For example, the network server module 340 may make a list corresponding to the data of the received packet and store the data and the list corresponding to the data in the memory (not shown). As a result, the application module 350 may use packet data by requesting a transmission of particular data from the network server module 340.

If the packet is not used in the secure world 300, the processor 100 may extract the data of the packet by using the TCP/IP module 320 of the secure world 300 and transmit the data of the packet to the normal world 200.

For example, referring to FIG. 2, if the packet is not used in the secure world 300, the processor 100 may transmit the extracted data of the packet to the monitor module 330 by using the TCP/IP module 320. Next, the processor 100 may transmit the data of the packet to the trust zone driver module 230 by using the monitor module 330. Thereafter, the processor 100 may transmit the data of the packet to the application module 240 of the normal world 200 by using the trust zone driver module 230. Through this, the application module 240 may use the data of the packet. If the TCP/IP module 320, the network driver module 310, and the like of the secure world 300 are used as described above, security of data that will be processed in the normal world 200 may be greatly improved.

An operation of receiving and processing data has been described above, but even if data is generated and output to an external source, the normal world 200 and the secure world 300 may be selectively used.

In detail, if data is generated in the secure world 300, the processor 100 may generate a secure packet corresponding to the generated data by using the TCP/IP module 320 of the secure world 300 and transmit the secure packet to the external network by using the network driver module 310 of the secure world 300.

For example, referring to FIG. 2, if a request for transmitting data to the external network is received from the application module 350, the processor 100 may store the data generated in the application module 350 in the memory (not shown) and simultaneously transmit the data to the TCP/IP module 320 by using the network server module 340. Here, the processor 100 may generate the secure packet corresponding to the data by using the TCP/IP module 320 of the secure world 300 and transmit the secure packet to the external network by using the network driver module 310 of the secure world 300.

If data is generated in the normal world 200, the processor 100 may generate a normal packet corresponding to the generated data by using the TCP/IP module 220 of the normal world 200 and transmit the normal packet to the external network by using the network driver module 210 of the normal world 200.

For example, referring to FIG. 2, if a request for transmitting data to the external network is received from the application module 240, the processor 100 may transmit the corresponding data to the TCP/IP module 220. The processor 100 may generate the normal packet corresponding to the data by using the TCP/IP module 220 of the normal world 200 and transmit the normal packet to the external network by using the network driver module 210 of the normal world 200.

Figure 4:
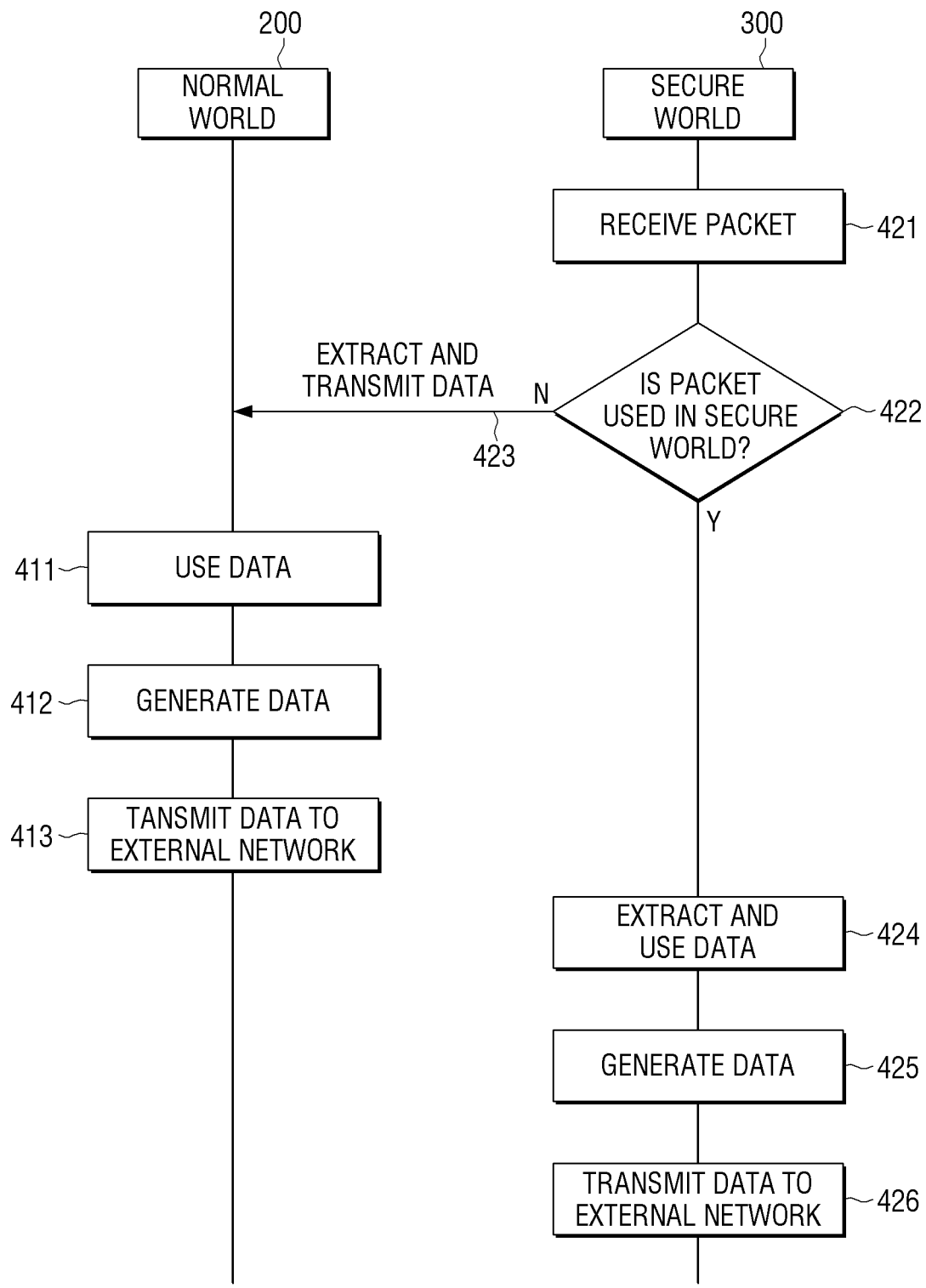
FIG. 4 is a timing chart for describing a process of processing data in a security network system according to an exemplary embodiment of the present invention.

FIG. 4 is a timing chart for describing a process of processing data in the security network system 100 according to an exemplary embodiment of the present invention.

Referring to FIG. 4, for example, if the secure world 300 receives a packet from the external network in operation 421, the processor 100 may determine whether the packet received from the external network is a packet used in the secure world 300 in operation 422. If it is determined in operation 422 that the corresponding packet is not the packet that will be used in the secure world 300, the processor 100 may extract data from the packet and transmit the data to the normal world 200 in operation 423. Here, the processor 100 may use the transmitted data in the normal world 200 in operation 411. Thereafter, if data is generated in the normal world 200 in operation 412, the processor 100 generate a packet corresponding to the generated data and transmit the packet to an external source in operation 413.

If the packet received from the external network is the packet used in the secure world 300 in operation 422, the processor 100 may extract data from the corresponding packet and use the data in operation 424. Thereafter, if data is generated in the secure world 300 in operation 425, the processor 100 may generate a packet corresponding to the generated data and transmit the packet to the external source in operation 426.

Figure 5:
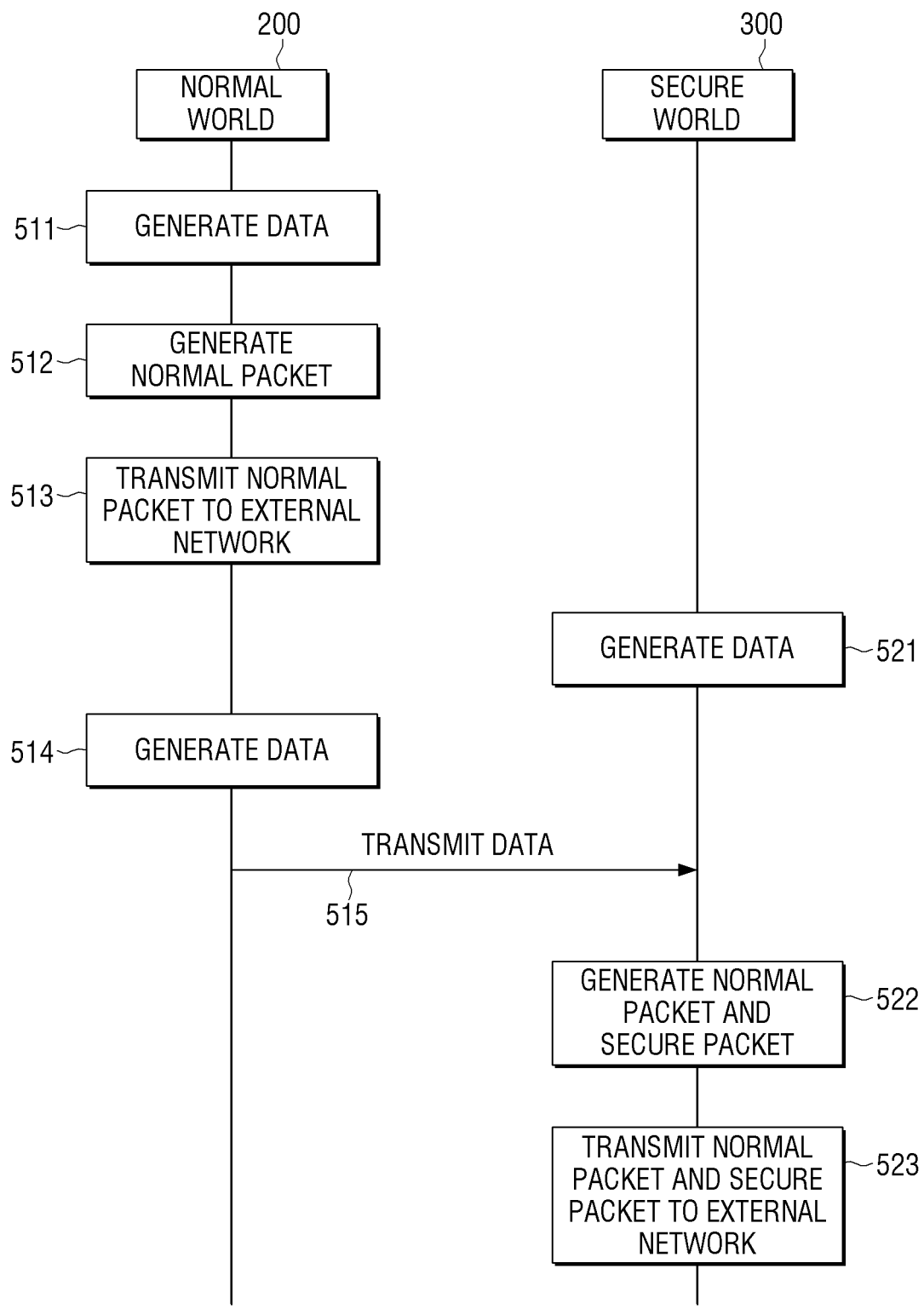
FIG. 5 is a timing chart for describing a process of processing data in a security network system according to another exemplary embodiment of the present invention.

FIG. 5 is a timing chart for describing a process of processing data in the security network system 1000 according to another exemplary embodiment of the present invention.

If a data transmission from the normal world 200 and a data transmission from the secure world 300 are respectively requested, the processor 100 may transmit data generated in the normal world 200 and data generated in the secure world 300 together to the external network by using the TCP/IP module 320 and the network driver module 310 of the secure world 300.

Basically, when transmitting packets respectively generated in the normal world 200 and the secure world 300 to the external network, the security network system 1000 may use the TCP/IP modules 220 and 320 and the network driver modules 210 and 310 of the normal world 200 and the secure world 300.

However, if there is a single network hardware device (not shown) that is usable by the security network system 100 and has a packet transmitting and receiving function, the packet generated in the normal world 200 and the packet generated in the secure world 300 may not simultaneously transmitted to the external network. Here, the processor 100 may transmit data generated in the normal world 200 to the secure world 300, generate a packet in the secure world 300, and transmit the packet to the external network.

For example, referring to FIG. 5, if data is generated in the normal world 200 in operation 511, the processor 100 may generate a normal packet corresponding to the generated data by using the TCP/IP module 220 in operation 512 and may transmit the generated normal packet to the external network by using the network driver module 210 in operation 513. If it is determined that data is generated in the secure world 300 in operation 521 when the packet is transmitted from the normal world 200 to the external network through the above-described process, the processor 100 may transmit the data generated in the normal world 200 to the secure world 300 by using the trust zone driver module 230 and the monitor module 330 in operation 515. In operation 522, the processor 100 may generate a normal packet corresponding to the data of the normal world 200 and a secure packet corresponding to the data of the secure world 300 in arrival orders of the data of the normal world 200 and the data of the secure world 300 at the TCP/IP module 320. Here, the processor 100 may transmit the packets to the external network in generation orders by using the network driver module 310 in operation 523.

The above-described contents may be understood that there is a single network hardware device (not shown) having a packet transmitting and receiving function, but there may be a plurality of network hardware devices respectively corresponding to the normal world 200 and the secure world 300. For example, if there are a plurality of pieces of network hardware (not shown) that may be usable by the security network system 100, the normal world 200 and the secure world 300 may respectively use different pieces of network hardware (not shown). In this case, the TCP/IP module 220 and the network driver module 210 of the respective worlds may process merely data generated in corresponding worlds.

Figure 6:
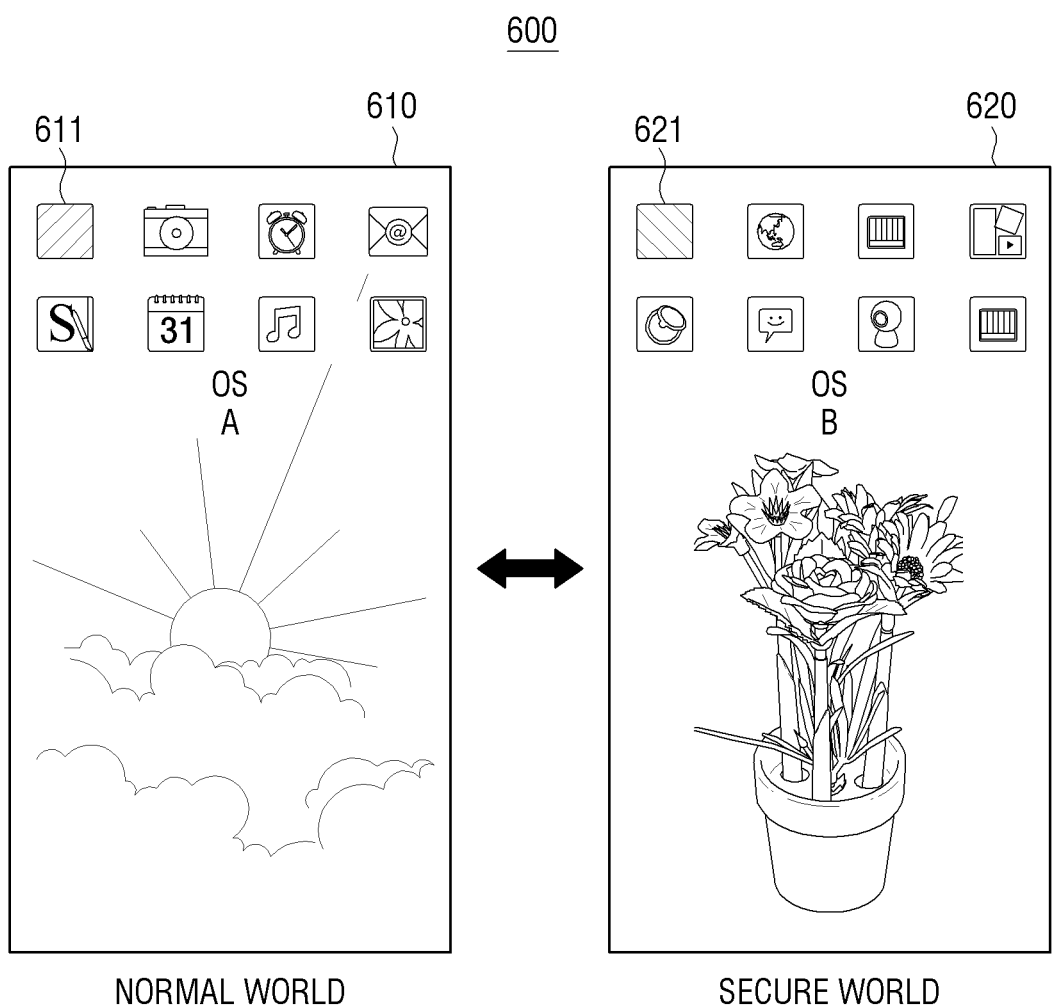
FIG. 6 illustrates a UI change depending on a change in an operating system of a security network system according to an exemplary embodiment of the present invention.

FIG. 6 illustrates a UI change depending on a change in an operating system of the security network system 1000 according to an exemplary embodiment of the present invention.

Referring to FIG. 6, for example, an operating system of the normal world 200 may be referred to as OS A, an operating system of the secure world 300 may be referred to as OS B, an electronic device 600 (e.g., a portable phone, a PDA, a PC, or the like) may operate in these operating systems. If a GUI 611 for a change to the secure world 300 is touched in a UI 610 corresponding to an operation of the operating system OS A of the normal world 200, the processor 100 may end the OS A and drive the operating system OS B of the secure world 300. Here, the processor 100 may control a display (not shown) of the electronic device 600 to display a UI 620 corresponding to an operation of the OS B. On the contrary, if a GUI 621 for a change to the normal world 200 is touched in a screen UI 620 corresponding to the operation of the operating system OS B of the secure world 300, the processor 100 may end the OS B and drive the operating system OS A of the normal world 200. Here, the processor 100 may control the display (not shown) of the electronic device 600 to display the UI 610 corresponding to the operation of the OS A.

Figure 7:
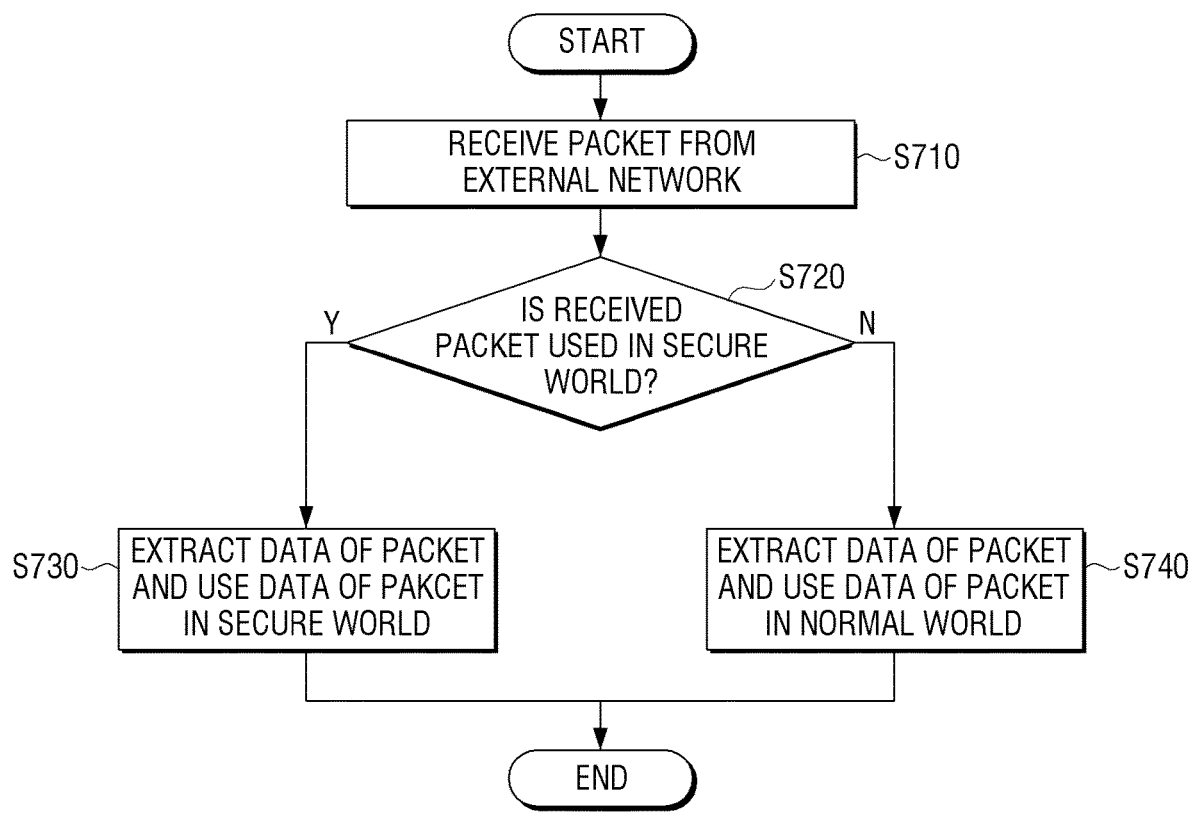
FIG. 7 is a flowchart of a data processing method of a security network system according to an exemplary embodiment of the present invention.

FIG. 7 is a flowchart of a data processing method of the security network system 1000 according to an exemplary embodiment of the present invention.

In operation S710, a packet is received from the external network by using the network driver module 310 of the secure world 300. If the received packet is used in the secure world 300 in operation S720, data of the packet may be extracted by using the TCP/IP module 320 of the secure world 300, and the data of the packet may be used in the secure world 300 in operation S730. If the packet is not used in the secure world 300 in operation S720, the data of the packet is extracted by using the TCP/IP module 320 of the secure world 300, and the data of the packet may be used in the normal world 200 in operation S740.

Here, the using of the data of the packet in the normal world 200 may include, if the packet is not used in the secure world 300, extracting the data of the packet by using the TCP/IP module 320 of the secure world 300 and transmitting the extracted data from the monitor module 330 of the secure world 300 to the normal world 200.

The data processing method may further include determining whether the packet is used in the secure world 300 according to field information of a packet header.

Here, the secure world 300 may include the network server module 340 that takes charge of data communication in the secure world 300, and integrates and manages the data of the packet.

The data processing method may further include, if data is generated in the secure world 300, generating a security packet corresponding to the generated data by using the TCP/IP module 320 of the secure world 300 and transmitting the security packet to the external network by using the network driver module 310 of the secure world 300.

The data processing method may further include, if data is generated in the normal world 200, generating a normal packet corresponding to the generated data by using the TCP/IP module 220 of the normal world 200 and transmitting the normal packet to the external network by using the network driver module 310 of the normal world 200.

The data processing method may further include, if a data transmission from the normal world 200 and a data transmission from the secure world 300 are respectively requested, transmitting data generated in the normal world 200 and data generated in the secure world 300 together to the external network by using the TCP/IP module 320 and the network driver module 310 of the secure world 300.

Figure 8:
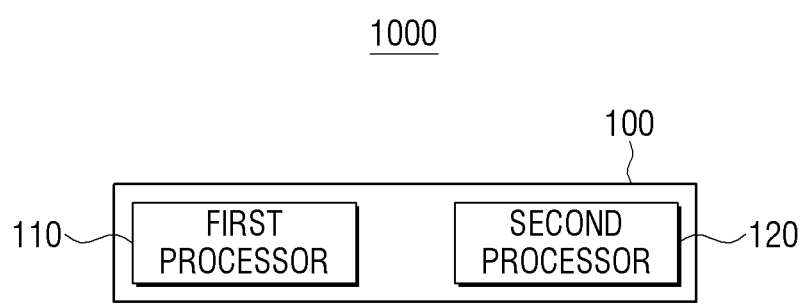
FIG. 8 is a block diagram of a configuration of a security network system according to another exemplary embodiment of the present invention.

Referring to FIG. 8, the security network system 1000 according to another exemplary embodiment may include a first processor 100 that corresponds to the normal world 200 so as to operate and a second processor 120 that corresponds to the secure world 300 so as to operate. The first processor 110 may execute a non-secure operation, and the second processor 120 may execute a secure operation. Also, the second processor 120 may be isolated from an access from an external source and may be protected from an unapproved control of the first processor 110.

The security network system 1000 has been described above. The security network system 1000 may be realized as at least one processor, a System on Chip (SoC), or an embedded type. The security network system 1000 may also be realized as an independent electronic device. For example, the security network system 1000 may be realized as a portable phone, a PMP, a PDA, an MP3, an electronic pad, a notebook, a TV, a PC, or the like. Hereinafter, a detailed configuration of the security network system 1000 that is realized as a portable phone will be described in detail with reference to FIG. 9.

Figure 9:
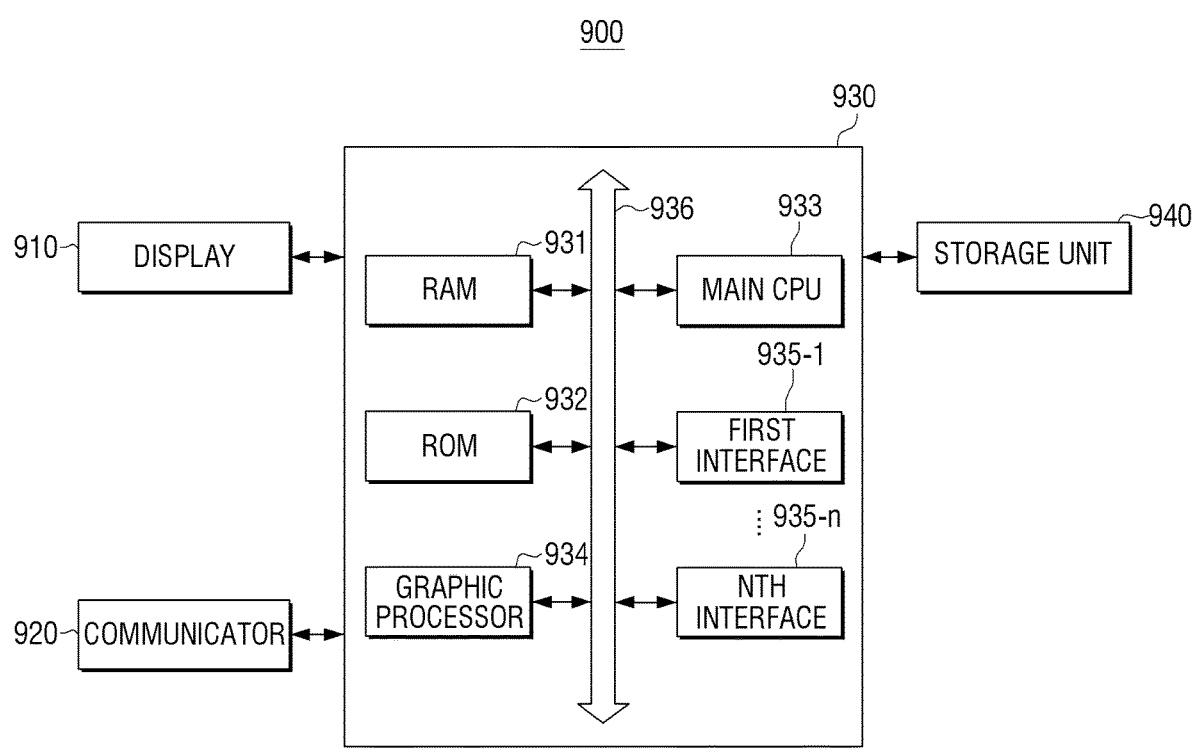
FIG. 9 is a block diagram of another example of a detailed configuration of a security network system according to an exemplary embodiment of the present invention.

FIG. 9 is a block diagram of an example of a detailed configuration of the security network system 1000 that is realized as a portable phone. Hereinafter, for convenience of description, the security network system 1000 will be described as a portable phone 900.

The portable phone 900 may include a display 910, a communicator 920, a controller 930, and a storage unit 940.

The controller 930 is an element for controlling an overall operation of the portable phone 900 by using various types of programs stored in the storage unit 940. Referring to FIG. 9, the controller 930 includes an RAM 931, an ROM 932, a main CPU 933, a graphic processor 934, and a first through $n^{th}$ interfaces 935-1 through 935-n.

The RAM 931, the ROM 932, the main CPU 933, the graphic processor 934, the first through $n^{th}$ interfaces 935-1 through 935-n, and the like may be connected to one another through a bus 936.

The first through $n^{th}$ interfaces 935-1 through 935-n are connected to various types of elements described above. One of interfaces may be a network interface that is connected to an external apparatus through a network.

The main CPU 933 may perform booting by using an O/S, which corresponds to the normal world 200 and is stored in the storage unit 940, and the ROM 932 by accessing the storage unit 940. If booting is performed in the normal world 200, the main CPU 933 may read various types of modules stored in the storage unit 940, store the various types of modules in the RAM 931, and perform various types of functions of the normal world 200 by using the stored module. The main CPU 933 may also change from the normal world 200 to the secure world 300 so as to operate in response to a user manipulation. Here, the main CPU 933 may store data of a state of the normal world 200 in the storage unit 940, read data of the secure world 300 pre-stored in the storage unit 940, and store the data in the RAM 931. Through this, the main CPU 933 may operate in the secure world 300. The main CPU 933 may also perform various types of operations by using various types of programs, contents, data, and the like stored in the storage unit 940. The main CPU 933 perform a role corresponding to a processor mentioned in the above-described several exemplary embodiments.

The ROM 932 stores a command set and the like for system booting. If power is supplied by inputting a turn-on command, the main CPU 933 boots a system by copying an O/S stored in the storage unit 940 into the RAM 931 and executing the O/S according to a command stored in the ROM 932. If booting is completed, the main CPU 933 performs various types of operations by copying various types of application programs stored in the storage unit 940 into the RAM 931 and executing the application programs copied into the RAM 931.

The graphic processor 934 generates a screen including various types of objects such as an icon, an image, a text, and the like by using an operator (not shown) and a renderer (not shown). The operator (not shown) calculates attribute values, such as coordinate values at which objects will be displayed, shapes, sizes, colors, and the like of the objects, according to a layout of the screen based on a received control command. The renderer (not shown) generates a screen of various types of layouts including objects based on the attribute values calculated by the operator (not shown). The screen generated by the renderer (not shown) is displayed on the display 910. The graphic processor 934 also performs UI rendering as described above with reference to FIG. 6. In detail, if the main CPU 933 changes the OS, the graphic processor 934 constitutes a layout screen of the changed OS and display the layout screen on the display 910 by using graphic data corresponding to the changed OS.

The operation of the controller 930 described above may be performed by a program stored in the storage unit 940.

The storage unit 940 may store various types of data such as an Operating System (O/S) software module for driving the portable phone 900, various types of multimedia contents, and the like.

The storage unit 940 may store the network driver module 210, the TCP/IP module 220, the trust zone driver module 230, and the application module 240 corresponding to the normal world 210 and the network driver module 310, the TCP/IP module 320, the monitor module 330, the network server module 340, and the application module 350 corresponding to the secure world 300 in a separate memory area so as to separately provide data of modules stored in storage areas corresponding to the respective worlds when the controller 930 operates in each of the normal world 200 and the secure world 300.

The display 910 displays an operating system and an image generated by an application. In detail, the display 910 may display various types of screens generated by the graphic processor 934. For this, the display 910 may be realized as a Liquid Crystal Display (LCD), an Organic Light Emitting Display (OLED), or the like.

The communicator 920 performs communication with an external electronic device (not shown). Here, the communicator 920 may perform communications with the external electronic device (not shown) through various types of communication methods such as BlueTooth (BT), Wireless Fidelity (WI-FI), Zigbee, Infrared (IR), Serial Interface, a Universal Serial Bus (USB), Near Field Communication (NFC), and the like.

As described above, a security network system and a data processing method therefor according to various exemplary embodiments of the present invention may be applied to various types of electronic devices. Also, a program for performing the data processing method may be stored on an arbitrary computer readable recording medium and then provided for various kinds of electronic devices.

For example, there may be provided a computer readable recording medium that stores a program performing receiving a packet from the external network by using the network driver module 310 of the secure world 300, if the received packet is used in the secure world 300, extracting data of the packet by using the TCP/IP module 320 of the secure world 300 and using the data of the packet in the secure world 300, and if the packet is not used in the secure world 300, extracting the data of the packet by using the TCP/IP module 320 of the secure world 300 and using the data of the packet in the normal world 200.

The computer readable recording medium is a medium which does not store data temporarily such as a register, cash, and memory but stores data semi-permanently and is readable by devices. More specifically, the aforementioned applications or modules may be stored in computer readable recording media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present invention. The present teaching may be readily applied to other types of apparatuses. Also, the description of the exemplary embodiments of the present invention is intended to be illustrative, and not to limit the scope of the claims, and many alternatives, modifications, and variations will be apparent to those skilled in the art.

The invention claimed is:

1. A security network system comprising:
a hardware processor configured to be selectively operable in a non-secure runtime environment and a secure runtime environment,
wherein the hardware processor is further configured to:
obtain a packet from an external network by using a network driver module of the secure runtime environment,
identify whether the obtained packet is to be used in the non-secure runtime environment or the secure runtime environment,
based on identifying that the obtained packet is to be used in the secure runtime environment, extract data of the packet by using a transmission control protocol/Internet protocol (TCP/IP) module of the secure runtime environment and process the data of the packet by using a network server module of the secure runtime environment, the network server module being configured to control data communication in the secure runtime environment and manage the data of the packet, and
based on identifying that the obtained packet is to be used in the non-secure runtime environment, extract the data of the packet by using the TCP/IP module of the secure runtime environment, and transmit the extracted data of the packet to the non-secure runtime environment,
wherein the secure runtime environment is controlled by a secure operating system, and the non-secure runtime environment is controlled by another operating system that is different from the secure operating system, and
wherein based on a data transmission from the non-secure runtime environment and a data transmission from the secure runtime environment being respectively requested, the hardware processor transmits the data generated in the non-secure runtime environment and the data generated in the secure runtime environment together by using the TCP/IP module and the network driver module of the secure runtime environment.

2. The security network system of claim 1, wherein the hardware processor identifies whether the packet is used in the secure runtime environment, by using field information comprised in a packet header of the packet.

3. The security network system of claim 1, wherein based on the data being generated in the secure runtime environment, the hardware processor generates a secure packet corresponding to the generated data by using the TCP/IP module of the secure runtime environment and transmits the secure packet to the external network by using the network driver module of the secure runtime environment.

4. The security network system of claim 3, wherein based on the data being generated in the non-secure runtime environment, the hardware processor generates a normal packet corresponding to the generated data by using a TCP/IP module of the non-secure runtime environment and transmits the normal packet to the external network by using a network driver module of the non-secure runtime environment.

5. A data processing method of a security network system selectively operating in a non-secure runtime environment and a secure runtime environment, the data processing method comprising:
obtaining a packet from an external network by using a network driver module of the secure runtime environment;
identifying whether the obtained packet is to be used in the non-secure runtime environment or the secure runtime environment,
based on identifying that the obtained packet is to be used in the secure runtime environment, extracting data of the packet by using a transmission control protocol/Internet protocol (TCP/IP) module of the secure runtime environment and processing the data of the packet by using a network server module of the secure runtime environment, the network server module being configured to control data communication in the secure runtime environment and manage the data of the packet;
based on identifying that the obtained packet is to be used in the non-secure runtime environment, extracting the data of the packet by using the TCP/IP module of the secure runtime environment, and processing the extracted data of the packet in the non-secure runtime environment; and
based on a data transmission from the non-secure runtime environment and a data transmission from the secure runtime environment being respectively requested, transmitting the data generated in the non-secure runtime environment and the data generated in the secure runtime environment together by using the TCP/IP module and the network driver module of the secure runtime environment, wherein the secure runtime environment is controlled by a secure operating system, and the non-secure runtime environment is controlled by another operating system that is different from the secure operating system.

6. The data processing method of claim 5, wherein the using of the data of the packet in the non-secure runtime environment comprises: based on identifying that the packet is not to be used in the secure runtime environment, extracting the data of the packet by using the TCP/IP module of the secure runtime environment, and transmitting the extracted data from a monitor module of the secure runtime environment to the non-secure runtime environment.

7. The data processing method of claim 5, further comprising:
identifying whether the packet is used in the secure runtime environment according to field information of a packet header.

8. The data processing method of claim 5, further comprising:
based on the data being generated in the secure runtime environment, generating a secure packet corresponding to the generated data by using the TCP/IP module of the secure runtime environment; and
transmitting the secure packet to the external network by using the network driver module of the secure runtime environment.

9. The data processing method of 8, further comprising:
based on data being generated in the non-secure runtime environment, generating a normal packet corresponding to the generated data by using a TCP/IP module of the non-secure runtime environment; and
transmitting the normal packet to the external network by using a network driver module of the non-secure runtime environment.

10. A non-transitory computer readable recording medium that stores computer program instructions that, when executed by a processor, cause the processor to be selectively operable in a non-secure runtime environment and a secure runtime environment, wherein the computer program instructions further cause the processor to:

obtain a packet from an external network by using a network driver module of the secure runtime environment, identify whether the obtained packet is to be used in the non-secure runtime environment or the secure runtime environment, based on identifying that the obtained packet is to be used in the secure runtime environment, extract data of the packet by using a transmission control protocol/Internet protocol (TCP/IP) module of the secure runtime environment and process the data of the packet by using a network server module of in the secure runtime environment, the network server module being configured to control data communication in the secure runtime environment and manage the data of the packet, based on identifying that the obtained packet is to be used in the non-secure runtime environment, extract the data of the packet by using the TCP/IP module of the secure runtime environment, and transmit the extracted data of the packet to the non-secure runtime environment; and based on a data transmission from the non-secure runtime environment and a data transmission from the secure runtime environment being respectively requested, to transmit the data generated in the non-secure runtime environment and the data generated in the secure runtime environment together by using the TCP/IP module and the network driver module of the secure runtime environment, wherein the secure runtime environment is controlled by a secure operating system, and the non-secure runtime environment is controlled by another operating system that is different from the secure operating system.

* * * * *